(12) United States Patent
Banerjee et al.

(10) Patent No.: US 8,548,689 B2
(45) Date of Patent: Oct. 1, 2013

(54) IMPLEMENT INDUCED MACHINE PITCH DETECTION

(75) Inventors: Paroma Banerjee, Peoria, IL (US); Troy Becicka, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 381 days.

(21) Appl. No.: 12/953,125

(22) Filed: Nov. 23, 2010

(65) Prior Publication Data

US 2012/0130601 A1    May 24, 2012

(51) Int. Cl.
  *G06F 19/00* (2011.01)
  *E02F 9/24* (2006.01)

(52) U.S. Cl.
  USPC .............................. 701/50; 702/154; 340/440

(58) Field of Classification Search
  None
  See application file for complete search history.

(56) References Cited

U.S. PATENT DOCUMENTS

| | | |
|---|---|---|
| 4,643,615 A | 2/1987 | Pelsy |
| 5,999,872 A | 12/1999 | Kinugawa et al. |
| 7,658,234 B2 | 2/2010 | Brandt et al. |
| 2003/0146829 A1* | 8/2003 | Carlson et al. ................ 340/440 |
| 2009/0293322 A1* | 12/2009 | Faivre et al. .................... 37/348 |

FOREIGN PATENT DOCUMENTS

| | | |
|---|---|---|
| EP | 2060530 | 5/2009 |
| JP | 8-119582 | * 5/1996 |
| WO | 2006098645 | 9/2006 |
| WO | 2009076719 | 6/2009 |

* cited by examiner

*Primary Examiner* — Michael J Zanelli
(74) *Attorney, Agent, or Firm* — Leydig, Voit & Mayer

(57) ABSTRACT

A system for detecting pitch of a machine caused by operation of a machine implement is provided. The system may include an inclination sensor for sensing inclination of the machine and producing inclination data representing inclination of the machine over time. An acceleration sensor for sensing acceleration of the machine and producing acceleration data representing acceleration of the machine over time can be provided. A controller in communication with the inclination and acceleration sensors respectively receives the inclination and acceleration data. The controller can be configured to process the inclination data so as to detect a sudden inclination change and to process the acceleration data so as to detect a sudden acceleration change. The controller can be further configured to determine a machine pitch condition upon concurrently detecting a sudden inclination change and a sudden acceleration change.

20 Claims, 3 Drawing Sheets

IMPLEMENT INDUCED MACHINE PITCH DETECTION

TECHNICAL FIELD

This patent disclosure relates generally to machines with implements and, more particularly to systems and methods for detecting pitch of a machine caused by operation of a machine implement.

BACKGROUND

Many machines used in earthworking, construction, mining, agriculture and similar industries utilize machines having specialized implements. These implements can be used to perform a variety of different tasks. One issue with operation of such implements is that under certain circumstances it can cause the machine to pitch into an undesirable position. One application where this can be an issue is hard rock ripping. In earth ripping applications, the machine, such as a track-type tractor, is equipped with a ripper that is typically attached to the rear of the machine with the front of the machine being provided with another implement such as a blade or a bucket.

Hard rock ripping is traditionally a manual operation that can be quite difficult because the process necessarily involves unseen underground obstacles. For example, the ripper can get hung up on underground boulders or bedrock. Because the ripper tip cannot penetrate the rock, it can pitch the machine forward lifting the rear idler off the ground. When this happens, the entire weight of the machine is supported by a few grousers under the front idler. Moreover, the undercarriage bogies no longer provide suspension dampening and most of the vibration caused by operation of the ripper is transmitted to the chassis. This can accelerate wear of the chassis, track and ripper shank. It also leads to reduced productivity since the ripper is not penetrating the ground. Typically, when a machine operator realizes the ripper is beginning to lift the rear idler and is no longer penetrating the ground, he manually raises the ripper. However, a skilled operator can only correct pitching of the machine, to the extent they become aware of it. For a variety of reasons, including that the ripper is mounted to the rear of the machine, it can be difficult for an operator to quickly recognize that the machine is pitching, particularly when operating on uneven ground. As a result, the process can be quite time consuming and inefficient and still results in added wear to the machine components.

SUMMARY

The disclosure describes, in one aspect a system for detecting pitch of a machine caused by operation of a machine implement. The system may include an inclination sensor for sensing inclination of the machine and producing inclination data representing inclination of the machine over time. An acceleration sensor for sensing acceleration of the machine and producing acceleration data representing acceleration of the machine over time can be provided. A controller in communication with the inclination and acceleration sensors respectively receives the inclination and acceleration data. The controller can be configured to process the inclination data so as to detect a sudden inclination change and to process the acceleration data so as to detect a sudden acceleration change. The controller can be further configured to determine a machine pitch condition upon concurrently detecting a sudden inclination change and a sudden acceleration change.

In another aspect, the disclosure describes a method of detecting pitch of a machine caused by operation of a machine implement. The method can include the steps of sensing inclination of the machine over time and sensing acceleration of the machine over time. The method can further includes the steps of monitoring the inclination of the machine to detect a sudden inclination change and monitoring the acceleration of the machine to detect a sudden acceleration change. A machine pitch condition can be determined upon concurrently detecting a sudden inclination change and a sudden acceleration change.

According to another aspect, the disclosure describes a machine that can include a chassis and an actuatable implement supported on the chassis. An inclination sensor can be provided for sensing inclination of the machine and producing inclination data representing inclination of the machine over time. An acceleration sensor can be provided for sensing acceleration of the machine and producing acceleration data representing acceleration of the machine over time. A controller can be in communication with the inclination and acceleration sensors for respectively receiving the inclination and acceleration data, the controller processing the inclination data so as to detect a sudden inclination change and processing the acceleration data so as to detect a sudden acceleration change, the controller being configured to determine a machine pitch condition upon concurrently detecting a sudden inclination change and a sudden acceleration change, wherein the controller adjusts operation of the implement upon determination of the machine pitch condition.

BRIEF DESCRIPTION OF THE DRAWING(S)

DETAILED DESCRIPTION

Figure 1:
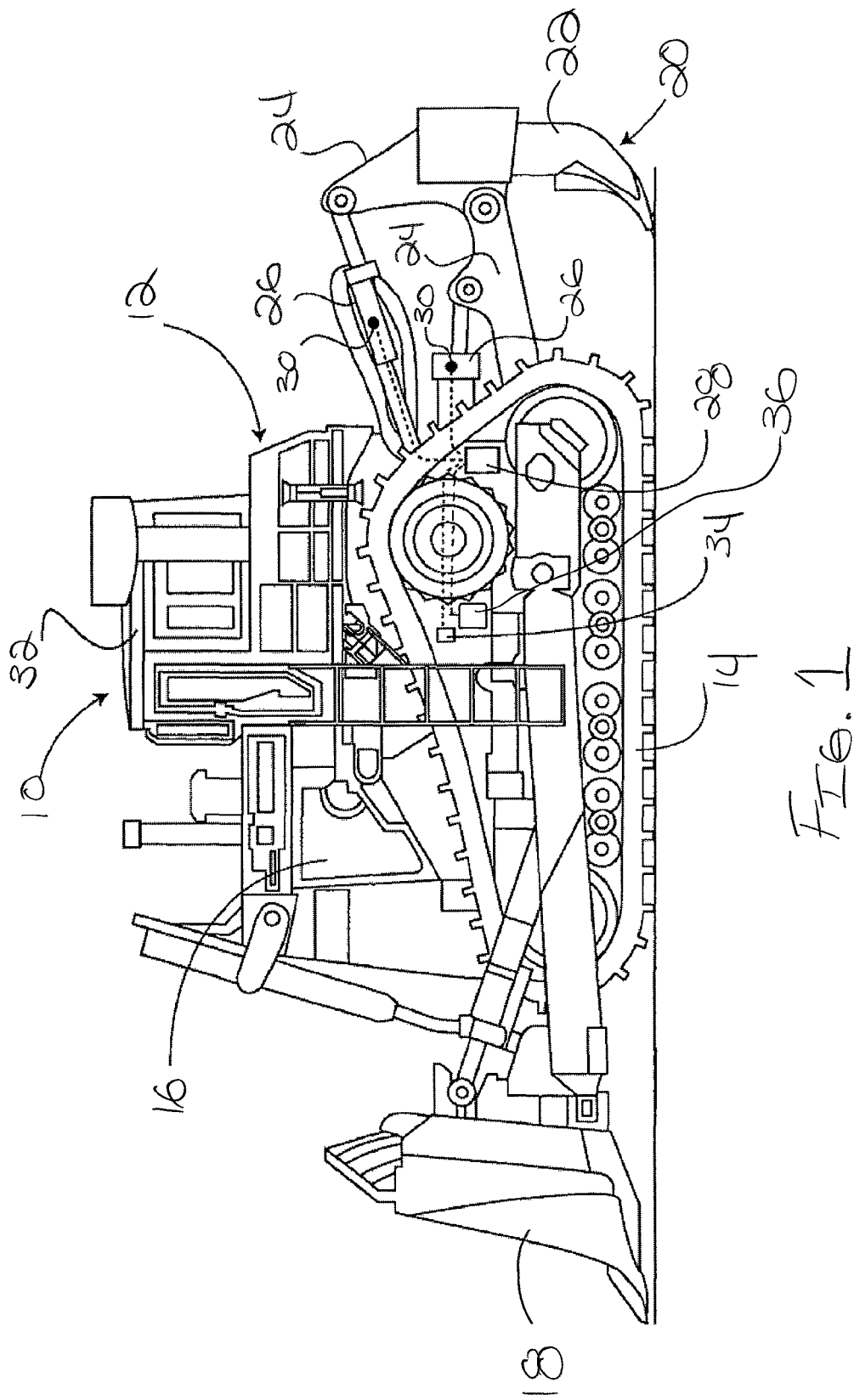
FIG. 1 is a side view of a track-type tractor equipped with an implement induced pitch detect system according to the disclosure.

This disclosure relates to a system and method for detecting pitch of a machine induced by operation of an implement. Referring to FIG. 1, there is shown an exemplary machine 10, in this case a track type tractor, including a chassis 12 and a pair of movable tracks 14 powered by an engine 16. A work implement may be supported on the front of the chassis 12. In the illustrated embodiment, the front work implement is a blade 18 that can be raised and lowered and otherwise positioned via actuators. Additionally, a ripper 20 is supported on the rear of the chassis 12 of the illustrated tractor. The ripper 20 can include a ripper shank 22 that is supported by a positioning linkage 24.

To manipulate the ripper 20, including changing the angular orientation and the lift position of the ripper, hydraulic actuators 26 may be provided. In this case, the ripper actuators 26 include a lift actuator and a tilt actuator as shown in FIG. 1. The actuators 26 may be operably controlled by an electronic controller 28. To facilitate such control, appropriate ripper sensors 30 may be provided including, for example, hydraulic pressure sensors, actuator position sensors and/or force or stress sensors. The actuators 26 may be controlled via control signals sent from the electronic controller 28. During ripping operations, these control signals may be based on manual commands entered by an operator in a conventional manner or may be generated by a ripper control algorithm that is part of the electronic controller 28.

The machine 10 also includes an operator cab 32 that may include appropriate operator inputs for controlling operation of the machine. For example, the cab 32 may include appropriate inputs to allow the operator to steer, position the front blade 18, position and operate the rear ripper 20, and to control the speed and forward/reverse direction of the tractor 10.

For detecting when operation of an implement supported on the chassis 12 has caused the machine 10 to pitch into an undesirable position, the machine 10 may be equipped with a pitch detection system 33 shown schematically in FIG. 1. The pitch detection system 33 may include an acceleration sensor 34 for sensing acceleration of the machine 10, an inclination sensor 36 for sensing inclination of the machine 10 and a controller 28 in communication with the acceleration and inclination sensors. In this case, the controller 28 may be the same controller used to direct operation of the ripper 20. Alternatively, a separate controller may be used.

The inclination sensor 36 may be supported on the chassis 12 and disposed to sense inclination of the chassis 12 relative to a reference plane and to produce inclination data representing inclination of the machine 10 over time. The acceleration sensor 34 may also be supported on the chassis 12 and disposed to sense acceleration in a longitudinal direction of the machine 10 and to produce acceleration data representing acceleration of the machine 10 over time.

The controller 28 may be configured to receive the acceleration data and the inclination data from respectively the acceleration sensor 34 and the inclination sensor 36. In order to determine if there has been an undesired machine pitch, the controller 28 may process the acceleration data and the inclination data so as to detect a sudden change in inclination and detect a sudden change in acceleration. If the controller 28 concurrently detects both a sudden inclination change and a sudden acceleration change, then it may determine a machine pitch condition. This prevents the pitch detection system 10 from producing false pitch warning signals when, for example, the machine's inclination is changing merely as the machine 10 follows a change in ground slope. The controller 28 may be configured to process the acceleration and inclination data at time intervals of five seconds or less and, according to one embodiment, at time intervals of three seconds or less.

Figure 2:
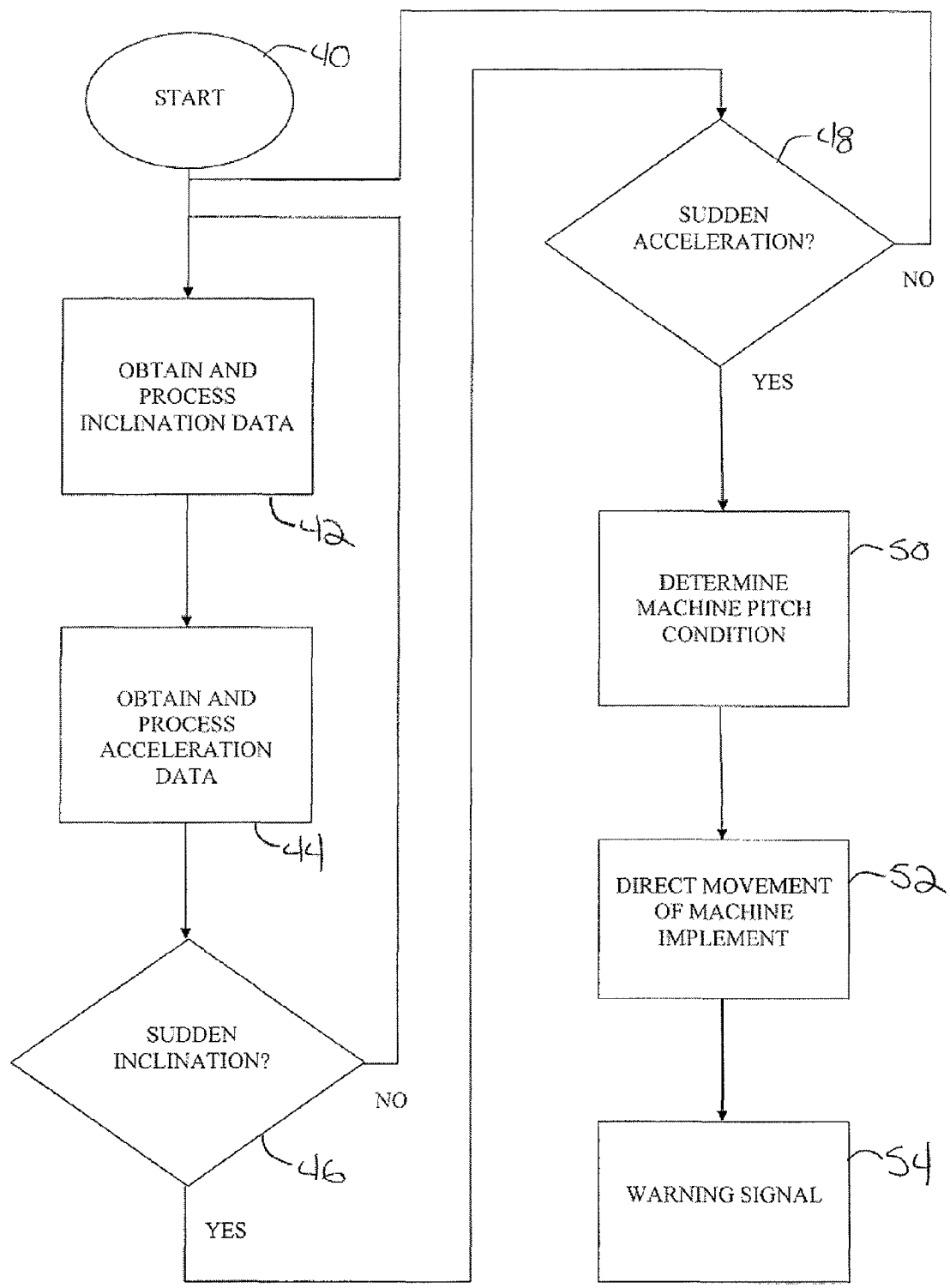
FIG. 2 is a flow chart of a pitch detection method according to the disclosure.

A flow chart of an exemplary pitch detection method and process that can be implemented by the controller 28 is provided in FIG. 2. After an initial start step 40, the process proceeds to two processing blocks 42, 44 in which the system obtains and processes the inclination and acceleration data respectively from the inclination and acceleration sensors 36, 34. These are shown as serial steps 42, 44 in FIG. 2, however, they also could occur in parallel. Moreover, while the inclination data is obtained and processed first in FIG. 2, the two steps 42, 44 can occur in any order.

After the inclination and acceleration data is obtained and processed, the method proceeds to two decision blocks 46, 48 in which it is determined whether there has been a sudden change in inclination and a sudden change in acceleration. This can be accomplished by comparing the processed inclination and acceleration data and to respective threshold values. Only if both decision blocks 46, 48 are answered true does the method proceed to the following processing block 50 in which a machine pitch condition can be determined. Again, while the sudden inclination decision block 46 is shown first in FIG. 2, the decision blocks 46, 48 can be executed in any particular order. Moreover, while the decision blocks 46, 48 are shown serially, they also could occur in parallel.

Upon determination of the machine pitch condition, the method can be configured to automatically move the ripper 20 into a position in which the machine pitch will be alleviated. For example, upon determination of the machine pitch condition in block 50, the method may be proceed to a processing block 52 in which controller 28 directs a movement of the machine implement, in this case the ripper 20. For example, the controller 28 can direct a raising of the ripper 20 via the actuators 26 to set the machine 10 down flat on the ground again. Depending on the application, the direct machine movement processing block 52 may be configured to lift the ripper shank 22 back out of the ground prior to penetrating the material again. In this regard, the pitch detection method may be part of a larger automatic ripper control system that is included in the controller 28.

In the illustrated embodiment, the method also proceeds to a processing block 54 in which a warning signal can be generated upon deteimination of a machine pitch condition. This warning signal could be configured as a visible and/or audible warning signal to an operator, for example, in the cab 32. While the illustrated method shows the warning signal being produced in a processing block 54 arranged after the direct machine implement movement block 52, the method does not have to include both blocks. For example, the system could be configured to produce only a warning signal or to only direct a machine implement movement. Moreover to the extent both blocks 52, 54 are provided, they could be arranged serially in any particular order or could be performed in parallel.

Figure 3:
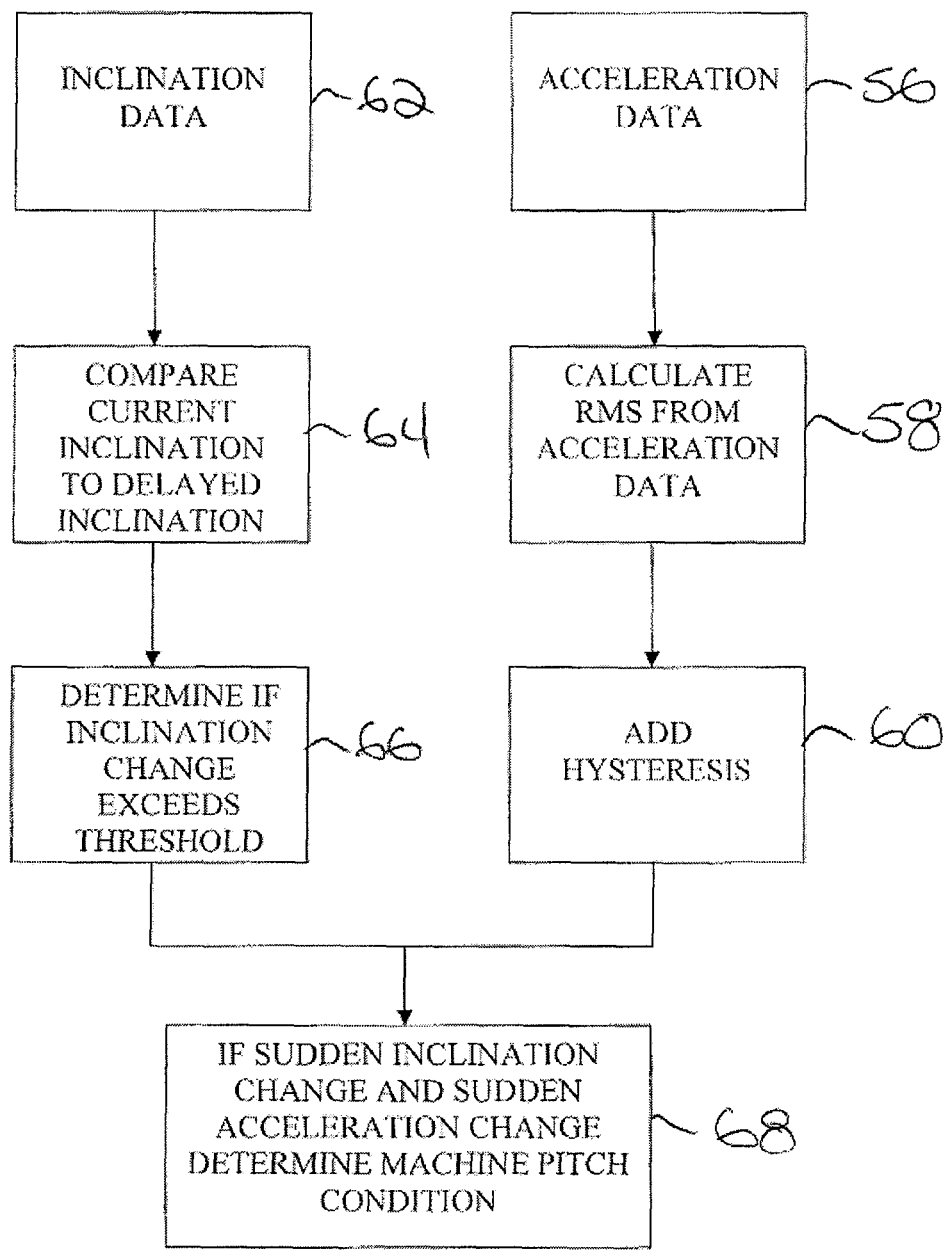
FIG. 3 is a block diagram of a data processing algorithm of a pitch detection system and method according to the disclosure.

For processing the inclination and acceleration data, the controller 28 may include an algorithm that may be used to process the acceleration and inclination data so as to facilitate the detection of sudden changes. A flow chart of an exemplary data processing algorithm is shown in FIG. 3. The illustrated algorithm takes the acceleration data received from the acceleration sensor 34, referenced in block 56 and first calculates a running root mean square (RMS) value in a subsequent processing block 58. This can be done to derive an average acceleration and thereby filter out brief spikes in the acceleration readings from the acceleration sensor 34. Such brief spikes can occur for a variety of reasons including erroneous readings by the sensor. A hysteresis function is then applied to the running mean square value in a following processing block 60. The hysteresis function is used in order to ensure that there is a sufficient change in acceleration to indicate a possible implement-induced machine pitch. For example, the hysteresis function can be configured such that a sudden change in acceleration is detected upon a twenty to thirty percent change in acceleration.

The illustrated data processing algorithm takes the inclination data from the inclination sensor 36, referenced in block 62, and compares current inclination to delayed inclination values in a first processing block 64. Comparing the current inclination with several delayed inclination values as opposed to a single delayed sample or a low pass filtered value can make the system more robust. In a following processing block 66, the data can then be evaluated to determine if inclination has changed beyond a threshold value that indicates a significant change in inclination for purposes of pitch detection. For instance, according to one embodiment, the predetermined value may be an inclination change of ten percent. This step can also be configured to detect whether the pitch has occurred in a particular direction. For example, when detecting machine pitch caused by operation of the rear-mounted ripper 20, the inclination change determination block 66 can be configured to detect a sudden change of inclination caused by a raising of the rear of the machine 10 with respect to the front of the machine 10. This is commonly referred to as a change in inclination in the negative direction with respect to the machine cab. Only upon processing of both the inclination and acceleration data and determining a sudden change in both does the algorithm proceed to determine a machine pitch condition in block 68.

The algorithm of FIG. 3 shows the processing of the inclination and acceleration data in parallel. In the controller 28, the data processing can be done in serial or in parallel, and, if done serially, in any particular order. Moreover, while a particular data processing algorithm that can be used by the controller 28 to process the inclination and acceleration data is shown in FIG. 3, other algorithms could also be used. For example, the algorithm can vary depending on the particular application or the particular machine in which the pitch detection system or method is to be implemented.

Industrial Applicability

The present disclosure is applicable to machines of any size and any configuration having an implement. The disclosure is particularly applicable to machines with rippers. When the shank of the ripper contacts something hard, it can cause the machine to pitch forward with the rear part of the machine lifting off the ground such that the entire weight of the machine is supported by the wheels or tracks at the front end of the machine. This limits the ability of the suspension of the machine to dampen vibration causing more vibration to be transmitted to the chassis. It also can lead to increased wear of the ripper shank and the track or wheels at the front end of the machine.

The disclosed pitch detection system can prevent unnecessary chassis vibration and the resultant wear by keeping the machine flat on the ground as much a possible allowing the suspension to help dampen the vibration. Also, the system may be configured to limit the amount of time that the ripper is lowered without ground penetration by automatically taking corrective action upon a pitch warning signal. Manually adjusting the position of the ripper to address a machine pitch situation can be difficult and time consuming for the operator and reduces productivity of the machine since the ripper may not be in the ground during the corrective action. The pitch detection system can be configured as a stand alone system or it may be implemented as part of a larger implement control system. For example, the pitch detection system could be part of an autonomous or semi-autonomous hard rock ripping system or even a simple automatic ground penetration control.

While the disclosed pitch detection system and method is illustrated in connection with a track-type tractor, it has applicability to various other types of machines as well. In this regard, the term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, while the disclosed pitch detection system and method is illustrated in connection with operation of a ripper, it has applicability to operation of other machine mounted implements as well particularly including other rear-mounted implements. For example, other implements may include buckets, compactors, forked lifting devices, brushes, grapples, cutters, shears, blades, breakers/hammers, augers, and others.

It will be appreciated that the foregoing description provides examples of the disclosed system and method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A system for detecting pitch of a machine caused by operation of a machine implement comprising:
    an inclination sensor for sensing inclination of the machine and producing inclination data representing inclination of the machine over time;
    an acceleration sensor for sensing acceleration of the machine in a longitudinal direction relative to the machine and producing acceleration data representing acceleration of the machine in the longitudinal direction over time; and
    a controller in communication with the inclination and acceleration sensors for respectively receiving the inclination and acceleration data, the controller being configured to process the inclination data so as to detect a sudden inclination change and to process the acceleration data so as to detect a sudden acceleration change in the longitudinal direction, the controller being configured to determine a machine pitch condition upon concurrently detecting a sudden inclination change and a sudden acceleration change in the longitudinal direction.

2. The system of claim 1 wherein the controller is configured to direct a movement of the implement upon determining a machine pitch condition.

3. The system of claim 1 wherein the controller is configured to produce a warning signal upon determining a machine pitch condition.

4. The system of claim 1 wherein the processing of the acceleration data by the controller includes calculating a root mean square.

5. The system of claim 4 wherein the processing of the acceleration data by the controller includes adding hysteresis.

6. The system of claim 1 wherein the processing of the inclination data by the controller includes comparing current inclination to delayed inclination.

7. The system of claim 6 wherein the processing of the inclination data by the controller includes determining if an inclination change exceeds a threshold value.

8. A method of detecting pitch of a machine caused by operation of a machine implement:
    sensing inclination of the machine over time;
    sensing acceleration of the machine in a longitudinal direction relative to the machine over time;
    monitoring the inclination of the machine to detect a sudden inclination change;
    monitoring the acceleration of the machine in the longitudinal direction to detect a sudden acceleration change in the longitudinal direction; and determining a machine pitch condition upon concurrently detecting a sudden inclination change and a sudden acceleration change in the longitudinal direction.

9. The method of claim 8 further including the step of directing a movement of the machine implement upon determining a machine pitch condition.

10. The method of claim 8 further including the step of producing a warning signal upon determining a machine pitch condition.

11. The method of claim 8 wherein the step of sensing acceleration in the longitudinal direction is accomplished using an acceleration sensor and the step of monitoring acceleration of the machine in the longitudinal direction includes processing of acceleration data from an acceleration sensor that senses acceleration.

12. The method of claim 8 wherein the step of sensing inclination is accomplished using an inclination sensor and the step of monitoring inclination of the machine include processing of inclination data from an inclination sensor.

13. A machine comprising:
   a chassis;
   an actuatable implement supported on the chassis;
   an inclination sensor for sensing inclination of the machine and producing inclination data representing inclination of the machine over time;
   an acceleration sensor for sensing acceleration of the machine in a longitudinal direction relative to the machine and producing acceleration data representing acceleration of the machine in the longitudinal direction over time; and
   a controller in communication with the inclination and acceleration sensors for respectively receiving the inclination and acceleration data, the controller processing the inclination data so as to detect a sudden inclination change and processing the acceleration data so as to detect a sudden acceleration change in the longitudinal direction, the controller being configured to determine a machine pitch condition upon concurrently detecting a sudden inclination change and a sudden acceleration change in the longitudinal direction, wherein the controller adjusts operation of the implement upon determination of the machine pitch condition.

14. The machine of claim 13 wherein the implement is a ripper.

15. The machine of claim 14 wherein the ripper is supported on a rear end of the chassis.

16. The machine of claim 13 wherein the controller is configured to direct a movement of the implement upon determining a machine pitch condition.

17. The machine of claim 13 wherein the controller is configured to produce a warning signal upon determining a machine pitch condition.

18. The machine of claim 13 wherein the processing of the acceleration data by the controller includes calculating a root mean square.

19. The machine of claim 13 wherein the processing of the acceleration data by the controller includes adding hysteresis.

20. The machine of claim 13 wherein the processing of the inclination data by the controller includes comparing current inclination to delayed inclination and determining if an inclination change exceeds a threshold value.

* * * * *

UNITED STATES PATENT AND TRADEMARK OFFICE
CERTIFICATE OF CORRECTION

PATENT NO. : 8,548,689 B2  Page 1 of 1
APPLICATION NO. : 12/953125
DATED : October 1, 2013
INVENTOR(S) : Banerjee et al.

It is certified that error appears in the above-identified patent and that said Letters Patent is hereby corrected as shown below:

In the Specification

Column 4, line 18, delete "deteimination" and insert -- determination --.

Column 5, line 17, delete "Industrial Applicability" and insert -- INDUSTRIAL APPLICABILITY --.

Signed and Sealed this
Eleventh Day of August, 2015

Michelle K. Lee
*Director of the United States Patent and Trademark Office*